US006628738B1

United States Patent
Peeters et al.

(10) Patent No.: US 6,628,738 B1
(45) Date of Patent: Sep. 30, 2003

(54) METHOD OF ARRANGEMENT TO DETERMINE A CLOCK TIMING ERROR IN A MULTI-CARRIER TRANSMISSION SYSTEM, AND A RELATED SYNCHRONIZATION UNITS

(75) Inventors: Miguel Peeters, Brussels (BE); Thierry Pollet, Ghent (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/158,596

(22) Filed: Sep. 22, 1998

(30) Foreign Application Priority Data

Sep. 22, 1997 (EP) .............................. 97402201

(51) Int. Cl.[7] .................. H04L 25/00; H04L 25/40; H04L 7/00; H04B 17/00; H04B 3/46
(52) U.S. Cl. .................. 375/371; 375/226; 375/355
(58) Field of Search ................. 375/371, 226, 375/355

(56) References Cited

U.S. PATENT DOCUMENTS

| | | | | |
|---|---|---|---|---|
| 4,679,227 A | * | 7/1987 | Hughes-Hartogs | 379/93.31 |
| 5,640,431 A | * | 6/1997 | Bruckert et al. | 375/344 |
| 5,818,872 A | * | 10/1998 | Gupta | 375/222 |
| 6,115,433 A | * | 9/2000 | de Lantremange | 375/326 |

FOREIGN PATENT DOCUMENTS

| EP | 0453203 | 10/1991 |
|---|---|---|
| EP | 0656706 | 6/1995 |
| WO | 9602991 | 2/1996 |

OTHER PUBLICATIONS

"Frequency Domain Echo Cancellation for Discrete Multi-tone Asymmetric Digital Subscriber Line Transceivers" Jones, IEEE Trans. on Comm. Vol 43, No. 2, Feb. 1, 1995, pp. 1663–1672.
ANSI Standard T1.413–1995 "Network and Customer Installation Interfaces—Asymmetric Digital Subscriber Line (ADSL) Metallic Interface", ANSI Standard.
J. Cioffi & P. Tong, "VLSI DMT Implementation for ADSL," Project T1E1.4: ADSL, Mar. 8, 1993, pp. 1–16, plus Abstract and Table of Contents.
ANSI Spec. T1E1.4, "Very–high Digital Subscriber Lines," Draft Technical Report—Rev. 8, Dec. 31, 1996, 34 pages.

* cited by examiner

Primary Examiner—Mohammad H. Ghayour
Assistant Examiner—Tony Al-Beshrawi
(74) Attorney, Agent, or Firm—Ware, Fressola Van Der Sluys & Adolphson (57) ABSTRACT

In a multi-carrier transmission system, a clock timing error ($\tau_e$) is calculated at the receiver's side and used for synchronization between a transmitting modem and a receiving modem (RX1). The clock timing error ($\tau_e$) is calculated from phase errors ($\phi_0, \phi_1, \ldots, \phi_i, \ldots, \phi_{N-1}$) detected for a plurality of pilot carriers during a tracking mode in such a way that the share ($A_i$) of a phase error ($\phi_i$) detected for a particular pilot carrier in the clock timing error ($\tau_e$) depends on the transmission quality ($SNR_i$) of that pilot carrier over the transmission medium in between the two modems. In this way, the robustness of the synchronization for narrowband noise near a pilot carrier is improved significantly.

7 Claims, 3 Drawing Sheets

METHOD OF ARRANGEMENT TO DETERMINE A CLOCK TIMING ERROR IN A MULTI-CARRIER TRANSMISSION SYSTEM, AND A RELATED SYNCHRONIZATION UNITS

TECHNICAL FIELD

The present invention relates to a method to determine during a tracking mode a clock timing error used for synchronisation purposes in a multi-carrier transmission system an arrangement adapted to perform this method as and synchronisation units to be used in such a multi-carrier system.

BACKGROUND OF THE INVENTION

Such a method and related equipment to perform this method are already known in the art, e.g. from the European Patent Application EP 0 453 203, entitled 'Method and apparatus for correcting for clock and carrier frequency offset, and phase jitter in multicarrier modems' from applicant Telebit Corporation. Therein, phases of a few pilot carriers are detected and used to calculate a clock timing error named a phase correcting signal (see page 3, lines 11–35 of the cited European Patent Application). As is indicated on page 6, lines 24–26 of EP 0 453 203, the phase correcting signal is used in a phase-locked loop (PLL) to realise synchronisation between a transmitting multi-carrier modem and a receiving multi-carrier modem.

In case of a norrowband interferer in the vicinity of one of the pilot carriers whose phases are detected to calculate the clock timing error, use of phase information extracted from this pilot carrier renders the so called clock timing error or phase correcting signal less accurate as a measure for the timing difference between transmitting and receiving modem. As a consequence, synchronisation between the transmitting and receiving modem may be lost in the known system when one of the pilot carriers is affected by noise.

SUMMARY OF THE INVENTION

An object of the present invention is to provide a method, arrangement and synchronisation units similar to those known, but whose robustness for narrowband noise near the pilot carriers is optimised.

According to the invention, this object is achieved by a method to determine during a tracking mode in a multi-carrier system a clock timing error used for synchronisation purposes, the method comprising the steps of detecting phase errors for a plurality of pilot carriers and calculating the clock timing error from the phase errors, wherein a share of a phase error of the phase errors in the clock timing error depends on a value of a transmission quality parameter measured for a pilot carrier of the pilot carriers for whom the phase error is measured.

It is also achieved by an arrangement to determine during a tracking mode in a multi-carrier system a clock timing error used for synchronisation purposes, the arrangement comprising: phase error detection means whereto a multi-carrier signal is applied, the phase error detection means being adapted to detect phase errors for a plurality of pilot carriers; and calculation means, coupled to the phase error detection means, and adapted to calculate the clock timing error from the phase errors, wherein the arrangement further comprises: share determination means, having an output coupled to the calculation means and being adapted to receive via an input thereof values of a transmission quality parameter related to the plurality of pilot tones and to determine shares of the phase errors in the clock timing error from the values of the transmission quality parameter; and further in that the calculation means is adapted to receive via an input thereof the shares and to calculate the clock timing error from the shares and the phase errors.

It is further achieved by a synchronisation unit to be used in a multi-carrier system, the synchronisation unit comprising: skip and duplicate means, adapted to remove a sample from or to duplicate a sample in a multi-carrier signal when a clock timing error becomes larger than or equal to a sample period; phase rotation means, coupled in series with the skip and duplicate means, and adapted to apply a phase shift to each carrier in the multi-carrier signal proportional to the clock timing error and proportional to a frequency of the carrier; a clock timing error determination arrangement, coupled to the phase rotation means, and adapted to determine during a tracking mode of the multi-carrier system the clock timing error, the clock timing error determination arrangement comprising phase error detection means whereto a multi-carrier signal is applied, the phase error detection means being adapted to detect phase errors for a plurality of pilot carriers; and calculation means, coupled to the phase error detection means, and adapted to calculate the clock timing error from the phase errors; and a feedback loop coupled to the clock timing error determination arrangement and having an output coupled to inputs of both the skip and duplicate means and the phase rotation means, the feedback loop being adapted to feed back the clock timing error to both the skip and duplicate means and the phase rotation means, wherein the clock timing error determination arrangement further comprises share determination means, having an output coupled to the calculation means and being adapted to receive via an input thereof values of a transmission quality parameter related to the plurality of pilot tones and to determine shares of the phase errors, in the clock timing error from the values of the transmission quality parameter; and further in that the calculation means is adapted to. receive via an input thereof the shares and to calculate the clock timing error from the shares and the phase errors.

Indeed, giving the phase error detected for a first pilot carrier which is transferred with a low transmission quality a relatively low share in the clock timing error used for synchronisation, and giving the phase error detected for a second pilot carrier which is transferred with a high transmission quality a relatively high share in the clock timing error used for synchronisation, has a filtering effect on the norrowband noise which affects the transmission quality of the first pilot carrier for this clock timing error. As a consequence, the variance of the clock timing error is reduced according to the present invention resulting in a better tracking of the timing-locked loop whereto the clock timing error is applied as input. This implies that the synchronisation process is made less sensitive for narrowband noise.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

An additional feature of the present invention is such a method where the value of the transmission quality parameter is determined during an acquisition mode preceding the tracking mode.

Indeed, it can be expected that the transmission quality of the medium in between two multi-carrier modems at a certain frequency does not change abruptly, unless impulse noise disturbs the medium. If the transmission quality of the medium at that certain frequency is measured once during an acquisition mode or initialisation procedure, the measured quality can be used for a long period. In Discrete Multi Tone (DMT) systems such as an Asynchronous Digital Subscriber Line (ADSL) system, the transmission quality of the medium has to be measured as a function of frequency during initialisation of the system to be able to execute the bit allocation procedure: the process wherein each carrier is assigned a number of bits depending on the transmission quality of this carrier. In such systems, the information required to perform the method according to the present invention is available once the system is in operation so that no additional measurements are required to determine the shares of phase errors of different pilot carriers in the clock timing error used for synchronisation. Only the phase errors of the different pilot carriers have to be detected during the tracking mode or normal operation process.

Another advantageous feature of the method is where the clock timing error is calculated as a weighted sum of the phase errors whereby the share of the phase error equals a weight coefficient in the sum.

In this way, the clock timing error becomes a linear combination of the phase errors detected for the different pilot carriers so that calculation of the clock timing error involves low mathematical complexity. Via the weights of the different terms in the linear combination, the phase errors get different shares in the clock timing error. These weights, according to the present invention, are dependent on the transmission quality of the respective pilot carriers.

Also an advantageous feature of the present invention is such a method where the share is linearly proportional to the value of the transmission quality parameter.

As will be proven later on in this document, a maximum likelihood based approach of the problem of calculating the clock timing error out of phase errors detected for a plurality of pilot tones results in a linear relationship between the weights and the transmission quality of the pilot carriers.

Yet another advantageous feature of the present method is where a proportionality factor between the share and the value of the transmission quality parameter is linearly dependent on a frequency of the pilot carrier.

Another result of the maximum likelihood approach set out later on in this document is that, for a particular pilot carrier, the coefficient which has to be multiplied with the transmission quality value to obtain the weight related to that pilot carrier is proportional to the frequency of that pilot carrier or the pilot carrier index in case the frequency is determined thereby.

A further feature of the method according to the present invention is where the weighted sum is normalised by a linear combination of values of the transmission quality parameter measured for the plurality of pilot carriers.

In this way, the weights are normalised.

Still a feature of the present invention is where a coefficient in the linear combination depends on a square frequency of a pilot carrier of the pilot carriers.

Thus, the complete gain of the arrangement that determines the clock timing error is made equal to one. This feature is particularly advantageous in a system where the number of pilot carriers used for synchronisation is adaptive. Independence of the level of the clock timing error from the number of pilot carriers used to determine this clock timing error, obtained by such a normalisation is advantageous from the point of view of hardware implementation.

Moreover, a feature of the present invention is where the transmission quality parameter is a signal-to-noise ratio.

Indeed, signal-to-noise ratio values of the different pilot carriers are excellent measures for the transmission quality of the medium between the multi-carrier modems. In an Asymmetric Digital Subscriber Line (ADSL) system operating according to the ANSI Standard T1.413-1995 entitled 'Network and Customer Installation Interfaces— Asymmetric Digital Subscriber Line (ADSL) Metallic Interface', a signal-to-noise ratio value is measured for each carrier during initialisation and used for bit allocation. This is indicated in paragraphs 12.6.6, 12.7.8 and 6.5 of the cited ANSI Standard. Alternative implementations of the present invention however may use other transmission quality parameters, for instance the noise level, to determine the shares of the phase errors of different pilot carriers in the clock timing error used for synchronisation.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein.

BEST MODE FOR CARRYING OUT THE INVENTION

Figure 1:
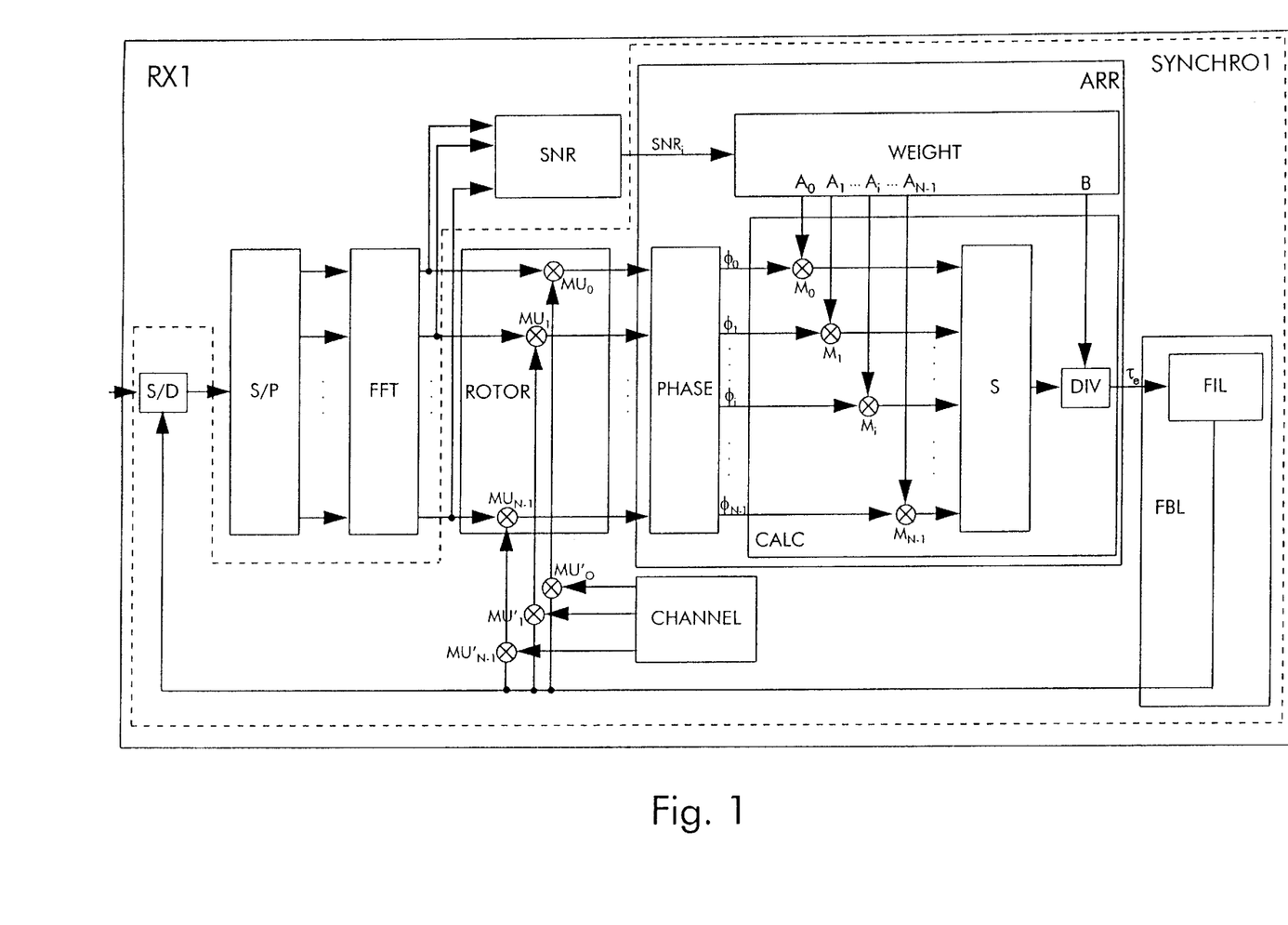
FIG. 1 shows a block scheme of a receiving multi-carrier modem RX equipped with an embodiment of the clock timing error determination arrangement RR according to the present invention.

The multi-carrier receiver RX1 drawn in FIG. 1 is provided with a skip and duplicate device S/D, a serial-to-parallel converter S/P, a fast fourier transformer FFT, a rotation device ROTOR, a clock timing error determination arrangement ARR, a feedback loop FBL, a channel gain device CHANNEL and a channel analysing device SNR. The rotation device ROTOR is equipped with N multipliers $MU_0$, $MU_1$, ..., $MU_{N-1}$, and the clock timing error determination arrangement ARR includes a phase detection unit PHASE, a weight determination unit WEIGHT, and a calculation unit CALC. The latter calculation unit CALC comprises N multipliers $M_0$, $M_1$, ..., $M_i$, $M_{N-1}$, an adder S and a divider DIV. The feedback loop FBL includes a filter FIL. The skip and duplicate device S/D, the rotation device ROTOR, the clock timing error determination arrangement ARR and the feedback loop FBL constitute a synchronisation system SYNCHRO1.

The incoming communication line is coupled via hybrid means, filtering and amplifying circuitry and an analogue to digital converter, not shown in FIG. 1, to an input of the skip and duplicate device S/D. An output of the skip and duplicate device S/D is connected to an input of the serial-to-parallel converter S/P and the outputs of this serial-to-parallel converter S/P are coupled to respective inputs of the fast fourier transformer FFT. Each output terminal of the fast fourier transformer FFT is coupled to both an input of the channel analysing device SNR and an input of the rotation device ROTOR. More detailed, a first output of the fast fourier transformer FFT is coupled to the first multiplier $MU_0$ in the rotation device ROTOR, a second output of the fast fourier transformer FFT is coupled to the second multiplier $MU_1$ in the rotation device ROTOR, ..., and the N'th output of the fast fourier transformer FFT is coupled to the N'th multiplier $MU_{N-1}$ in the rotation device ROTOR. The N multipliers $MU_0$, $MU_1$, ..., $MU_{N-1}$ further are coupled to respective inputs of the phase detection unit PHASE, and N outputs of this phase detection unit PHASE are coupled to the N multipliers $M_0$, $M_1$, ..., $M_i$, ..., $M_{N-1}$ in the calculation unit CALC respectively. The N multipliers $M_0$, $M_1$, ..., $M_i$, ..., $M_{N-1}$ have outputs connected to input terminals of the adder S, and this adder S is further connected to the divider DIV. An output of the divider DIV is feedback coupled to a control input of the skip and duplicate device S/D and to control terminals of the multipliers $MU_0$, $MU_1$, ..., $MU_{N-1}$ in the rotation device ROTOR via the filter FIL in the feedback loop FBL. Outputs of the channel gain device CHANNEL are also coupled to these control terminals of the multipliers $MU_0$, $MU_1$, ..., $MU_{N-1}$ via other multipliers $MU'_0$, $MU'_1$, ..., $MU'_{N-1}$ inserted in the feed back loop from the divider DIV to the rotation device ROTOR. The channel analysing device SNR is via an output thereof coupled to an input of the weight determination unit WEIGHT which has N+1 outputs, labelled $A_0$, $A_1$, ..., $A_i$, ..., $A_{N-1}$, and B in FIG. 1. These outputs are coupled to second inputs of the multipliers $M_0$, $M_1$, ..., $M_i$, ..., $M_{N-1}$ and of the divider DIV in the calculation unit CALC respectively.

The receiver RX1 is supposed to be of the ADSL (Asymmetric Digital Subscriber Line) type and consequently receives at its input a multi-carrier signal following the recommendations of the already cited ADSL Standard. This implies for instance that the multi-carrier signal received by the modem RX1 is composed of a sequence of DMT (Discrete Multi Tone) symbols. Such a DMT symbol has a predetermined length in time and consists of the superposition of 256 modulated carriers with equidistant frequencies. In the symbol timing synchronisation process, the receiving modem RX1 basically detects the boundaries of the received DMT symbols in order to select the correct block of consecutive samples to be fed to the fast fourier transformer FFT. In other words, symbol timing recovery is defined as the process to determine for each incoming DMT symbol which is the first sample of the sequence of consecutive samples to be sent to the fast fourier transformer FFT. Several algorithms for symbol synchronisation are described in literature. Estimation of the symbol boundaries for instance may be executed with an accuracy equal to one sample period during an acquisition phase.

The present invention however is related to the process of sample timing synchronisation, wherein the receiving modem RX1 monitors the increase in difference in phase between the transmitter clock and the receiver clock and compensates for this difference via a feedback algorithm. The difference between the transmitter timing basis and receiver timing basis is compensated for during the normal transmission mode instead of during the acquisition phase because the clock differences can change all the time. The invention concerns the method to estimate the difference in clock timing between the transmitter and receiver clock. The more accurate this clock timing difference is determined, the better the sample timing synchronisation process will compensate for it. In the following paragraph, the role of the functional blocks drawn in FIG. 1 is discussed briefly. In an additional paragraph, a lower bound is derived for the variance on the estimation error of the clock timing error determined according to the present invention in function of the number of pilot carriers involved in the clock timing error determination method. A further paragraph describes a most likelihood based approach of the problem of determining the clock timing error and results in deriving a preferred embodiment of the present invention. Alternative synchronisation units for the one drawn in FIG. 1 wherein the same clock timing error determination arrangement ARR is used but which include other circuitry to realise the sample timing synchronisation are described in yet another paragraph which deals with FIG. 2 and FIG. 3. Some remarks and notes concerning the applicability of the present invention are listed in the paragraphs concluding the description of the present application.

After digitisation and having passed the skip and duplicate device S/D, the digitised multi-carrier signal is serial-to-parallel converted. The serial-to-parallel converter S/P thereto applies subsequent samples of one and the same DMT (Discrete Multi Tone) symbol to subsequent ones of its outputs. The fast fourier transformer FFT in addition converts these samples of one DMT symbol from time domain to frequency domain by executing the well-known Discrete Fourier Transformation. As a result thereof, each signal at an output terminal of the fourier transformer FFT represents a modulated carrier and can be seen as a vector point in a two-dimensional vector plane wherein the modulation constellation represents a set of points. The amplitude and phase that can be associated to this vector point in the two-dimensional vector plane correspond to the amplitude and phase of the modulated carrier at the output of the fast fourier transformer FFT. The rotation device ROTOR, coupled to the fast fourier transformer FFT, has the task to compensate for differences between the clocks in the transmitting modem, not drawn in the figure, and receiving modem RX1. The clock signal in the receiving modem RX1 is generated by a free running crystal, not shown in FIG. 1, and supplied to the clock input of the analogue to digital converter mentioned above. The clock differences introduce phase errors which are proportional to the frequencies of the carriers. The rotation device ROTOR consequently applies a phase shift or so called rotation to each one of the carriers in proportion to the frequency of the respective carrier so that the clock speed difference is compensated for. The channel gain device CHANNEL thereto realises that the signals fed back to the multipliers $MU_0$, $MU_1$, ..., $MU_{N-1}$ are proportional to the frequencies of the respective carriers. To be able to precisely compensate for the clock difference, the rotation device ROTOR needs accurate information with respect to the clock timing error $\tau_e$. It is the task of the clock timing error determination arrangement ARR and the feedback loop FBL to determine this clock timing error $\tau_e$ precisely and to feed it back to the rotation device ROTOR.

As soon as the clock timing error $\tau_e$ to be compensated for by the rotation device ROTOR becomes larger than one sample period, a sample has to be skipped or duplicated in the incoming digitised signal. This is the task of the skip and duplicate device S/D which therefore also receives the information generated by the clock timing error determination arrangement ARR and feedback loop FBL. The operation of the skip and duplicate device S/D and that of the rotation device ROTOR accords to well-known techniques described for instance in the contribution to the ADSL Standard T1E1.4/93-025, paragraphs 2.2, 2.2.7, 2.2.8, 3.2, 3.2.7 and 3.2.8. This contribution is entitled 'VLSI DMT Implementation for ADSL' and originates from Amati Communications Corporation. The accurateness of the clock timing error $\tau_e$ determined by the clock timing error determination arrangement ARR is of significant importance, since it determines the accurateness of the operations performed by the rotation device ROTOR and the skip and duplicate device S/D and thus also the accurateness of the whole synchronisation process between transmitting modem and receiving modem RX1. As will be shown in the following paragraph, a larger robustness for narrowband noise is obtained when multiple pilot carriers are used. Therefore, the phase detection unit PHASE produces phase errors $\phi_0$, $\phi_1, \ldots, \phi_i, \ldots, \phi_{N-1}$ for N carriers from observations of the fast fourier transformer's outputs. Although the phase detection unit PHASE measures the phase of the signals at the output of the fast fourier transformer FFT, it has to be noted that an alternative implementation of the phase detection unit PHASE may determine the difference between a received vector and an expected vector (determined by the closest constellation point in the constellation diagram) and can approximate the phase errors therefrom. Each phase error is multiplied with a corresponding weight coefficient $A_0, A_1, \ldots, A_i, \ldots, A_{N-1}$. These weights $A_0, A_1, \ldots, A_i, \ldots, A_{N-1}$ are determined by the weight determination unit WEIGHT on the basis of signal-to-noise ratio values $SNR_i$ measured for the different pilot carriers. During the acquisition mode, a predetermined sequence of bits is modulated on the carriers. The channel analyser SNR analyses these modulated carriers after transmission thereof over the communication line and measures the signal-to-noise ratio for each carrier. During tracking mode, the channel analyser SNR applies the signal-to-noise ratio values $SNR_i$ to the weight determination unit WEIGHT which determines the weight coefficients $A_0, A_1, \ldots, A_i, \ldots, A_{N-1}$ and applies them to the multipliers $M_0, M_1, \ldots, M_i, \ldots, M_{N-1}$ respectively. The weighted phase errors are summed together by the adder S and normalised with a normalisation factor B by the divider DIV. The normalisation factor B is also determined by the weight determination unit WEIGHT from the signal-to-noise ratio values $SNR_i$. The clock timing error $\tau_e$ obtained in this way at the output of the calculation unit CALC is fed back via the filter FIL and digital voltage controlled oscillator to the rotation device ROTOR and skip and duplicate device S/D. The feedback loop FBL may perform the function of a traditional phase locked loop (PLL). The rotation device ROTOR phase shifts each carrier of the multi-carrier signal proportional to the calculated clock timing error $\tau_e$ and to the frequency of the respective carrier. The signal supplied to the second terminals of the multipliers $MU_0, MU_1, \ldots, MU_{N-1}$ is made proportional to the frequency of the respective carriers by the channel gain device CHANNEL and the multipliers $MU'_0, MU'_1, \ldots, MU'_{N-1}$. When the clock timing error $\tau_e$ becomes larger than one sample period, the skip and duplicate device S/D is activated to either skip or duplicate a sample in the incoming multi-carrier signal.

Consider the received continuous time multi-carrier signal r(t) at the input of the receiver RX1:

$$r(t) = \sum_{m=-\infty}^{+\infty} \sum_{k=0}^{2N-1} \sum_{n=-0}^{2N-1} a_m^k \cdot g\left(t - \frac{n \cdot T}{2} - m(2 \cdot N + \upsilon) \cdot \frac{T}{2}\right) \cdot e^{i \frac{2\pi}{2N} \cdot k \cdot n} + n(t) \quad (1)$$

Herein, the following notation is used:
  N: Number of carriers in the DMT signal, i.e. 256 in an ADSL system;
  $a_m^k$: symbol modulating the k'th carrier in the m'th DMT symbol period;
  g(t): composite channel impulse response, i.e. the channel impulse response that is eventually equalised to reduce intersymbol interference;
  t: time;
  2/T: sampling rate;
  n(t): additive noise component;
  n: sample index;
  k: carrier index;
  m: DMT symbol index;
  $\upsilon$: number of guardband samples, i.e. the number of redundant samples in a cyclic prefix added to each DMT symbol to compensate for intersymbol interference;
  i: square root of −1;
  $\pi$: pi=3.1415;
  $\infty$: symbol representing infinity;
  $\tau e$: clock timing error at the output of the arrangement ARR;
  $\tau$: estimated time difference at the output of the feedback loop FBL; and
  $\tau$: time difference or difference in sample timing between the transmitting modem and receiving modem.

After the acquisition mode and assuming no timing error, the output of the fast fourier transformer FFT can be expressed as:

$$F_m^k = a_m^k \cdot G^k + N^k \quad (2)$$

Herein, $G^k$ represents the fourier transform of g(t) evaluated at the k'th carrier frequency which is equal to $$\frac{k}{N \cdot T}$$

and $N^k$ represents the contribution of the additive noise at the k'th carrier frequency.

In case of a clock timing difference equal to $\tau$, the output of the fast fourier transformer FFT can be expressed as:

$$F_m^k = a_m^k \cdot G^k \cdot e^{-i \frac{2\pi \cdot 2\tau}{2N \cdot T} \cdot k} + \tilde{N}^k \quad (3)$$

This expression (3) is correct as long as the clock timing difference $\tau$ is smaller than the difference between the channel impulse response duration and the guard time duration. The Cramer-Rao bound is a fundamental lower bound on the estimation of unbiased parameters. Estimation of the clock timing difference $\tau$, denoted by $\tau$ can be derived from observations of the fast fourier transform outputs. In the assumption that the additive noise contributions at the output of the fast fourier transformer FFT are uncorrelated, the lower bound on the timing error variance a can be expressed as:

$$E\{(\tau - \tilde{\tau})^2\} = \left(\frac{T}{2}\right)^2 \cdot \left(\frac{2N}{2\pi}\right)^2 \cdot \frac{1}{M} \cdot \left(\sum_k SNR_k \cdot k^2\right)^{-1} \quad (4)$$

Herein $$E\{(\tau - \tilde{\tau})^2\}$$

represents the Cramer-Rao lower bound on the variance of the clock timing error $$\tau - \tilde{\tau} = \tau_e,$$

M is the observation window expressed as an integer number of DMT symbols, and $SNR_k$ is the signal-to-noise ratio value associated with the k'th carrier. By definition, this signal-to-noise ratio value $SNR_k$ is equal to:

$$SNR_k = \frac{E\{|a_m^k|^2\} \cdot |G^k|^2}{E\{|N_m|^2\}} \quad (5)$$

In (5)

$$E\{|a_m^k|^2\}$$

represents the mean power of the m'th symbol, $|G^k|^2$ represents the gain of the channel, and $$E\{|N_m|^2\}$$

represents the mean noise power on carrier k. For transmission over a FEXT (Far End Crosstalk) dominated channel, the signal-to-noise ratio $SNR_k$ can be expressed as:

$$SNR_k = \frac{1}{K_f \cdot d} \cdot \left(\frac{NT}{k}\right)^2 \quad (6)$$

This is indicated in paragraph 6.2.1 of the 'VDSL System Requirements' with reference T1E1.4/96-153R3, published on Dec. 31, 1996. In expression (6), d equals the length of the transmission cable and $K_f$ represents the FEXT coupling constant. Substituting (6) in (4) gives for the Cromer-Rao lower bound the following expression:

$$E\{(\tau - \tilde{\tau})^2\} = \frac{1}{K} \cdot \frac{K_f \cdot d}{4 \cdot M \cdot \pi^2} \quad (7)$$

Herein, K represents the number of outputs of the fast fourier transformer FFT used to produce the clock timing error $\tau_e$.

From (7) it can be concluded that it is advantageous to base the calculation of the clock timing error $\tau_e$ on multiple carriers. In a FEXT dominated environment the variance on the clock timing error $\tau_e$ is proportional to the inverse of the number of carriers used. When selecting only a limited number of pilot carriers to produce the clock timing error $\tau_e$, one should take the carriers with the largest product of the signal-to-noise ratio and squared carrier index in order to obtain the lowest clock timing error variance. In the receiver RX1 of FIG. 1, all carriers are used by the clock timing determination arrangement ARR to produce the estimate of the clock timing error $\tau_e$.

In a most-likelihood based approach, new timing error estimates are based on snapshots of the log likelihood function $$L_m(\tilde{\tau}_m)$$

whereby:

$$L_m(\tilde{\tau}_m) = \qquad (8)$$

$$-\frac{K}{2} \cdot \ln(2\pi) - \frac{1}{2} \cdot \sum_k \ln(E\{|N^k|^2\}) - \sum_k \frac{\left|F_m^k - a_m^k \cdot G^k \cdot e^{-i\frac{2\pi \cdot 2\tilde{\tau}_m}{2N \cdot T} \cdot k}\right|^2}{2 \cdot E\{|N^k|^2\}}$$

During tracking mode, the clock timing error determination arrangement ARR produces reliable estimates of the transmitted data sequence while channel gains are known to the receiver (they have been measured during modem initialisation). Hence, at the m'th DMT symbol period, a Data Aided Most Likelihood (DA ML) clock timing error determination arrangement ARR produces the value $\tau_e$:

$$\tau_m = -2 \cdot \Im\left\{\frac{\pi}{N} \cdot \frac{2\tilde{\tau}_m}{T} \cdot \sum_k k \cdot \frac{F_m^k \cdot (a_m^k \cdot G^k)^* \cdot e^{i\frac{2\pi \cdot 2\tilde{\tau}_m}{2N \cdot T} \cdot k}}{2 \cdot E\{|N^k|^2\}}\right\} \quad (9)$$

Herein * denotes the complex cojugate and $\Im$ denotes the imaginary part. Substitution from (3) into (9) leads to the conclusion that the weight coefficent $A_i$ has to be equal to $SNR_i \cdot i$ and the normalisation factor B has to equal $$\sum_{k=0}^{N-1} k^2 \cdot SNR_k.$$

The derived timing error $\tau_e$ can be used to control either continuous time or discrete time based synchronisation structures.

Figure 2:
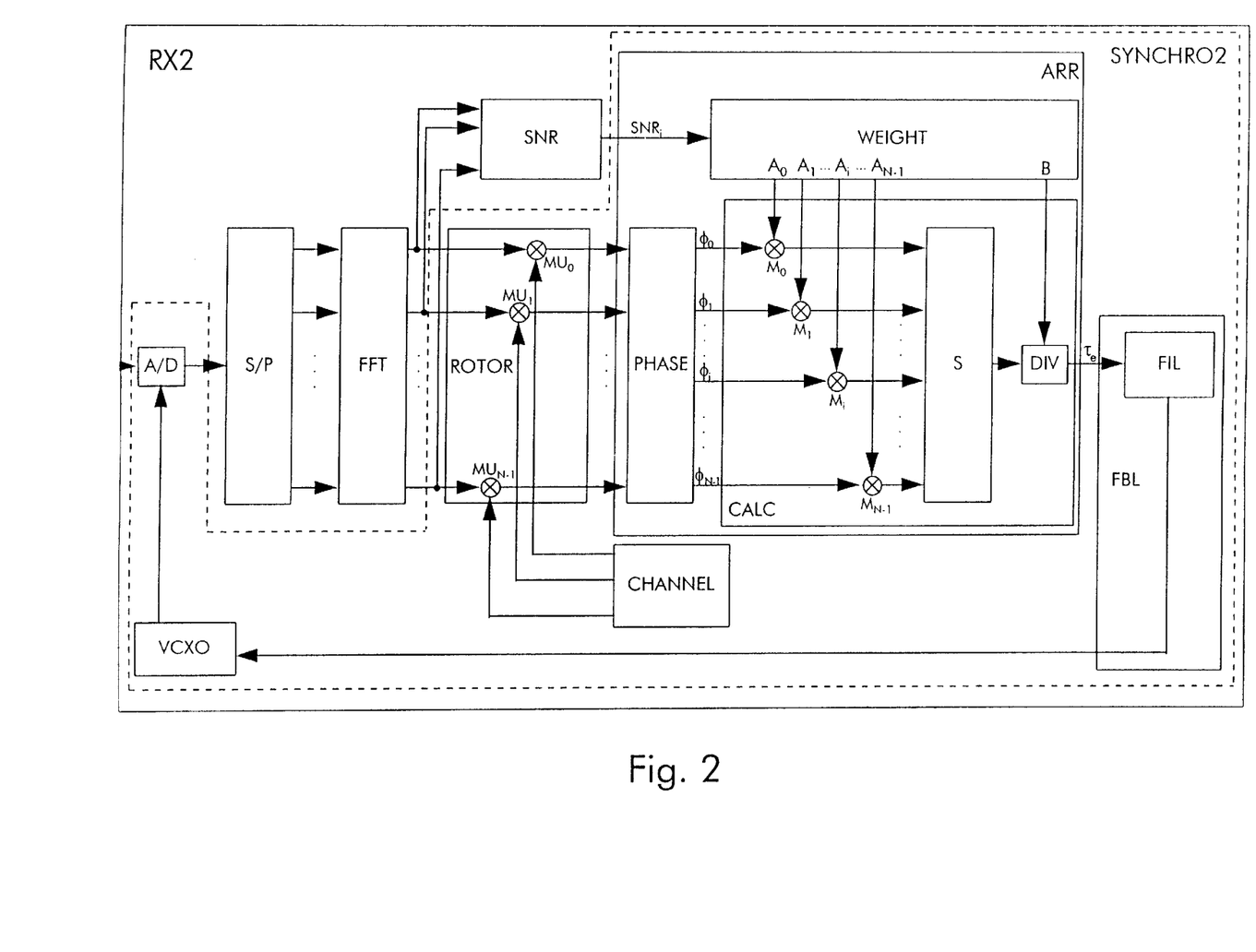
FIG. 2 shows a block scheme of a receiving multi-carrier modem RX2 equipped with a second synchronisation unit SYNCHRO2 including an embodiment of the clock timing error determination arrangement ARR according to the present invention.

In FIG. 2 a multi-carrier receiver RX2 is drawn which only differs from the multi-carrier receiver RX1 in FIG. 1 in the means used to realise sample timing synchronisation. The serial-to-parallel converter S/P, the fast fourier transformer FFT, the rotation device ROTOR, the clock timing error determination arrangement ARR and the components PHASE, CALC and WEIGHT thereof, the feedback loop FBL, the channel gain device CHANNEL and the channel analyser SNR perform exactly the same functions as the equally labelled functional blocks in FIG. 1. Instead of feeding back the clock timing error $\tau_e$ produced by the clock timing error determination arrangement ARR to the skip and duplicate device S/D and the rotation device ROTOR, the clock timing error $\tau_e$ in receiver RX2 is fed back to a voltage controlled crystal oscillator VCXO whose output is coupled to the clock input of the analogue to digital converter A/D. The clock timing error $\tau_e$ thus is used to adapt the sample period so that sample timing synchronisation between the transmitting modem and receiving modem is obtained. The analogue to digital converter A/D, the voltage controlled crystal oscillator VCXO, the rotation device ROTOR, the clock timing error determination arrangement ARR and the feedback loop FBL constitute a synchronisation unit SYN- CHRO2 which is an alternative for the synchronisation unit SYNCHRO1 of FIG. 1.

Figure 3:
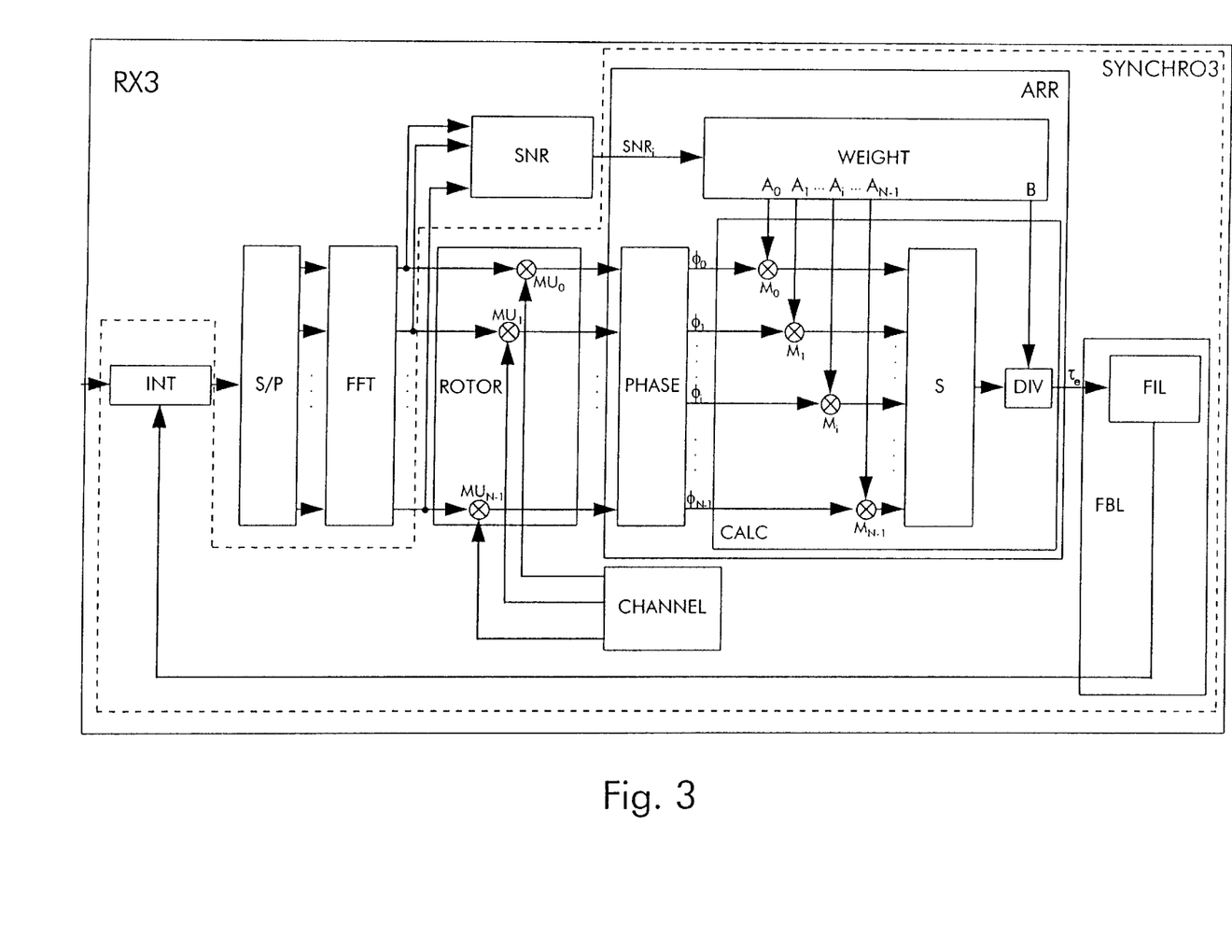
FIG. 3 shows a block scheme of a receiving multi-carrier modem RX3 equipped with a third synchronisation unit SYNCHRO3 including an embodiment of the clock timing error determination arrangement ARR according to the present invention.

Yet another multi-carrier receiver RX3 is drawn in FIG. 3. The serial-to-parallel converter S/P, the fast fourier transformer FFT, the rotation device ROTOR, the clock timing error determination arrangement ARR with its components PHASE, WEIGHT and CALC, the feedback loop FBL, the channel gain device CHANNEL and the channel analyse SNR again perform the same role as the equally labelled functional blocks in FIG. 1 and FIG. 2. The clock timing error $\tau_e$ now however is fed back to the interpolator INT whereto the serial-to-parallel converter S/P is coupled. The interpolator now provide for sample timing synchronisation by interpollating between two samples. The interpolator INT, the rotation device ROTOR, the clock time error determination arrangement ARR and the feedback loop, FBL constitute an alternative synchronisation unit SYNCHRO3 for the synchronisation units SYNCHRO1 and SYNCHRO2 drawn in FIG. 1 and FIG. 2 respectively.

A first remark is that, although the multi-carrier signal in the above described embodiment is transported over a telephone line, the applicability of the present invention is not restricted by the transmission medium via which the signal is transported. In particular, any connection between the transmitting modem and receiving modem RX, e.g. a cable connection, a satellite connection, a radio link through the air, and so on, may be affected by narrowband noise, and thus the synchronisation procedure can be improved according to the present invention.

The invention also is not only related to ADSL (Asymmetric Digital Subscriber Line) or similar systems wherein DMT (Discrete Multi Tone) modulation is used. A person skilled in the art will be able to adapt the above described embodiment so that it is applicable in any other system wherein a multi-carrier signal is transmitted from a transmitting modem to a receiving modem RX and wherein a plurality of pilot carriers are used for synchronisation purposes during the tracking mode. Systems wherein orthogonal frequency division multiplexing (OFDM) or orthogonally multiplexed quadrature amplitude modulation (OMQAM) is applied for instance are multi-carrier environments wherein the present invention is applicable.

Another remark is that embodiments of the present invention are described above in terms of functional. From the functionality description of these blocks, given above, it will be obvious for a person skilled in the art of designing electronic devices how embodiments of these blocks can be manufactured with well-known electronic components. A detailed architecture of the contents of the functional blocks hence is not given.

It is to be noticed that the weights $A_0, A_1, \ldots, A_i, \ldots, A_{N-1}$ and the normalisation factor B are calculated above in accordance to the results of a maximum likelihood approach. Although the above weights $A_0, A_1, \ldots, A_i, \ldots, A_{N-1}$ and normalisation factor B are to be used in a preferred embodiment of the present invention, the basic principle of the present invention, i.e. the use of transmission quality information for a plurality of pilot carriers to determine the shares of phase information obtained from these pilot carriers in the clock timing error $\tau_e$ that is used for synchronisation, is also satisfied when less optimal values are used for the weights $A_0, A_1, \ldots, A_i, \ldots, A_{N-1}$ or the normalisation factor B.

It is also noticed that applicability of the present invention is not restricted to digital environments. A person skilled in the art of electronic design knows that analogue equivalents exist for all functional blocks described above so that an analogue version of the present invention can be derived from the above described digital embodiments without inventive contribution.

While the principles of the invention have been described above in connection with specific apparatus, it is to be clearly understood that this description is made only by way of example and not as a limitation on the scope of the invention.

What is claimed is:

1. A method to determine during a tracking mode in a multi-carrier system a clock timing error ($\tau_e$) used for synchronisation purposes, said method comprising the steps of:

detecting phase errors ($\phi_0, \phi_1, \ldots, \phi_i, \ldots, \phi_{N-1}$) for a plurality of pilot carriers, and calculating said clock timing error ($\tau_e$) from said phase errors ($\phi_0, \phi_1, \ldots, \phi_i, \ldots, \phi_{N-1}$), wherein a share ($A_i$) of a phase error ($\phi_i$), of said phase errors ($\phi_0, \phi_1, \ldots, \phi_i, \ldots, \phi_{N-1}$) in said clock timing error ($\tau_e$) depends on a value ($SNR_i$) of a transmission quality parameter measured for a pilot carrier of said pilot carriers for whom said phase error ($\phi_i$) is measured, further comprising the step of calculating said clock timing error ($\tau_e$) as a weighted sum of said phase errors ($\phi_0, \phi_1, \ldots, \phi_i, \ldots, \phi_{N-1}$) whereby said share ($A_i$) of said phase error ($\phi_i$) equals a weight coefficient in said sum, wherein said share ($A_i$) is linearly proportional to said value ($SNR_i$) of said transmission quality parameter.

2. A method according to claim 1, wherein a proportionality factor between said shares ($A_i$) and said value ($SNR_i$) of said transmission quality parameter is linearly dependent on a frequency of said pilot carrier.

3. A method according to claim 1, wherein said weighted sum is normalised by a linear combination of values ($SNR_i$) of said transmission quality parameter measured for said plurality of pilot carriers.

4. A method according to claim 3, wherein a coefficient in said linear combination depends on a square frequency of a pilot carrier of said pilot carriers.

5. A synchronisation unit (SYNCHRO1) to be used in a multi-carrier system, said synchronisation unit (SYNCHRO1) comprising:

a. skip and duplicate means (S/D), adapted to remove a sample from or to duplicate a sample in a multi-carrier signal when a clock timing error ($\tau_e$) becomes larger than or equal to a sample period;

b. phase rotation means (ROTOR), coupled in series with said skip and duplicate means (S/D), and adapted to apply a phase shift to each carrier in said multi-carrier signal proportional to said clock timing error ($\tau_e$) and proportional to a frequency of said carrier;

c. a clock timing error determination arrangement (ARR), coupled to said phase rotation means (ROTOR), and adapted to determine during a tracking mode of said multi-carrier system said clock timing error ($\tau_e$), said clock timing error determination arrangement (ARR) comprising:

c1. phase error detection means (PHASE) whereto a multi-carrier signal is applied, said phase error detection means (PHASE) being adapted to detect phase errors ($\phi_0, \phi_1, \ldots, \phi_i, \ldots, \phi_{N-1}$) for a plurality of pilot carriers; and c2. calculation means (CALC), coupled to said phase error detection means (PHASE), and adapted to calculate said clock timing error ($\tau_e$) from said phase errors ($\phi_0, \phi_1, \ldots, \phi_i, \ldots, \phi_{N-1}$); and d. a feedback loop (FBL) coupled to said clock timing error determination arrangement (ARR) and having an output coupled to inputs of both said skip and duplicate means (S/D) and said phase rotation means (ROTOR), said feedback loop (FBL) being adapted to feed back said clock timing error ($\tau_e$) to both said, skip and duplicate means (S/D) and said phase rotation means (ROTOR), CHARACTERISED IN THAT said clock timing error determination arrangement ARR) further comprises:

c3. share determination means (WEIGHT), having an output coupled to said calculation means (CALC) and being adapted to receive via an input thereof values ($SNR_i$) of a transmission quality parameter related to said plurality of pilot tones and to determine shares ($A_0, A_1, \ldots, A_i, \ldots, A_{N-1}$) of said phase errors ($\phi_0, \phi_1, \ldots, \phi_i, \ldots, \phi_{N-1}$), in said clock timing error ($\tau_e$) from said values ($SNR_i$) of said transmission quality parameter; and further in that:

c4. said calculation means (CALC) is adapted to receive via an input thereof said shares ($A_0, A_1, \ldots, A_i, \ldots, A_{N-1}$) and to calculate said clock timing error ($\tau_e$) from said shares ($A_0, A_1, \ldots, A_i, \ldots, A_{N-1}$) and said phase errors ($\phi_0, \phi_1, \ldots, \phi_i, \ldots, \phi_{N-1}$).

6. A synchronisation unit (SYNCHRO2) to be used in a multi-carrier system, said synchronisation unit (SYNCHRO2) comprising:

a. sampling means (A/D) under control of a voltage controlled oscillator (VCXO), adapted to sample a multi-carrier signal, a period of said voltage controlled oscillator (VCXO) being controlled by a clock timing error ($\tau_e$);

b. phase rotation means (ROTOR), coupled in series with said sampling means (A/D), and adapted to apply a phase shift to each carrier in said multi-carrier signal proportional to a frequency of said carrier;

c. a clock timing error determination arrangement (ARR), coupled to said phase rotation means (ROTOR), and adapted to determine during a tracking mode of said multi-carrier system said clock timing error ($\tau_e$), said clock timing error determination arrangement (ARR) comprising:

c1. phase error detection means (PHASE) whereto a multi-carrier signal is applied, said phase error detection means (PHASE) being adapted to detect phase errors ($\phi_0, \phi_1, \ldots, \phi_i, \ldots, \phi_{N-1}$) for a plurality of pilot carriers; and c2. calculation means (CALC), coupled to said phase error detection means (PHASE), and adapted to calculate said clock timing error ($\tau_e$) from said phase errors ($\phi_0, \phi_1, \ldots, \phi_i, \ldots, \phi_{N-1}$); and d. a feedback loop (FBL) coupled to said clock timing error determination arrangement (ARR) and having an output coupled to an input of said voltage controlled oscillator (VCXO), said feedback loop (FBL) being adapted to feed back said clock timing error ($\tau_e$) to said voltage controlled oscillator (VCXO), CHARACTERISED IN THAT said clock timing error determination arrangement (ARR) further comprises:

c3. share determination means (WEIGHT), having an output coupled to said calculation means (CALC) and being adapted to receive via an input thereof values ($SNR_i$) of a transmission quality parameter related to said plurality of pilot tones and to determine shares ($A_0, A_1, \ldots, A_i, \ldots, A_{N-1}$) of said phase errors ($\phi_0, \phi_1, \ldots, \phi_i, \ldots, \phi_{N-1}$) in said clock timing error ($\tau_e$) from said value ($SNR_i$) of said transmission quality parameters; and further in that:

c4. said calculation means (CALC) is adapted to receive via an input thereof said shares ($A_0, A_1, \ldots, A_i, \ldots, A_{N-1}$) and to calculate said clock timing error ($\tau_e$) from said shares ($A_0, A_1, \ldots, A_i, \ldots, A_{N-1}$) and said phase errors ($\phi_0, \phi_1, \ldots, \phi_i, \ldots, \phi_{N-1}$).

7. A synchronisation unit (SYNCHRO3) to be used in a multi-carrier system, said synchronisation unit (SYNCHRO3) comprising:

a. interpolator means (INT), adapted to receive a multi-carrier input signal and to interpolate in between two successive samples of said multi-carrier input signal to generate an intermediate sample;

b. phase rotation means (ROTOR), coupled in series with said interpolator means (INT), and adapted to apply a phase shift to each carrier in said multi-carrier signal proportional to a frequency of said carrier;

c. a clock timing error determination arrangement (ARR), coupled to said phase rotation means (ROTOR), and adapted to determine during a tracking mode of said multi-carrier system said clock timing error ($\tau_e$), said clock timing error determination arrangement (ARR) comprising:

c1. phase error detection means (PHASE) whereto a multi-carrier signal is applied, said phase error detection means (PHASE) being adapted to detect phase errors ($\phi_0, \phi_1, \ldots, \phi_i, \ldots, \phi_{N-1}$) for a plurality of pilot carriers; and c2. calculation means (CALC), coupled to said phase error detection means (PHASE), and adapted to calculate said clock timing error ($\tau_e$) from said phase errors ($\phi_0, \phi_1, \ldots, \phi_i, \ldots, \phi_{N-1}$): and d. a feedback loop (FBL) coupled to said clock timing error determination arrangement (ARR) and having an output coupled to an input of a serial-to-parallel converter (S/P) via said interpolator means (INT), said feedback loop (FBL) being adapted to feed back said clock timing error ($\tau_e$) to said interpolator (INT);

CHARACTERISED IN THAT said clock timing error determination arrangement (ARR) further comprises:

c3. share determination means (WEIGHT), having an output coupled to said calculation means (CALC) and being adapted to receive via an input thereof values ($SNR_i$) of a transmission quality parameter related to said plurality of pilot tones and to determine shares ($A_0, A_1, \ldots, A_i, \ldots, A_{N-1}$) of said phase errors ($\phi_0, \phi_1, \ldots, \phi_i, \ldots, \phi_{N-1}$) in said clock timing error ($\tau_e$) from said values ($SNR_i$) of said transmission quality parameter; and further in that:

c4. said calculation means (CALC) is adapted to receive via an input thereof said shares ($A_0, A_1, \ldots, A_i, \ldots, A_{N-1}$) and to calculate said clock timing error ($\tau_e$) from said shares ($A_0, A_1, \ldots, A_i, \ldots, A_{N-1}$) and said phase errors ($\phi_0, \phi_1, \ldots, \phi_i, \ldots, \phi_{N-1}$).

* * * * *

UNITED STATES PATENT AND TRADEMARK OFFICE
CERTIFICATE OF CORRECTION

PATENT NO. : 6,628,738 B1
DATED : September 30, 2003
INVENTOR(S) : Peeters et al.

It is certified that error appears in the above-identified patent and that said Letters Patent is hereby corrected as shown below:

Title page, Item [54] Column 1, lines 1-5,
[54] Title, insert -- METHOD AND ARRANGEMENT TO DETERMINE A CLOCK TIMING ERROR IN A MULTI-CARRIER TRANSMISSION SYSTEM, AND RELATED SYNCHRONIZATION UNITS --.

Column 13,
Line 10, prior to "ARR)", please insert -- ( --.

Signed and Sealed this

Twenty-fifth Day of May, 2004

JON W. DUDAS
*Acting Director of the United States Patent and Trademark Office*